United States Patent [19]

Horiuchi

[11] 4,416,719
[45] Nov. 22, 1983

[54] APPARATUS FOR COVERING BASE SHEET SURFACE

[75] Inventor: Tatsuo Horiuchi, Tatebayashi, Japan

[73] Assignees: Ushio Denki Kabushiki Kaisha; Kabushiki Kaisha Meiko Shokai, both of Tokyo, Japan

[21] Appl. No.: 344,294

[22] Filed: Feb. 1, 1982

[30] Foreign Application Priority Data

Feb. 27, 1981 [JP] Japan ................................. 56-26854
Feb. 27, 1981 [JP] Japan ................................. 56-26855

[51] Int. Cl.³ .......................................... B32B 31/00
[52] U.S. Cl. ................................... 156/359; 156/555; 156/583.1; 219/347; 219/358; 219/469; 219/501; 219/504
[58] Field of Search ..................... 156/555, 582, 583.1; 219/469–471, 243–244, 216, 354, 347–349, 358

[56] References Cited

U.S. PATENT DOCUMENTS 2,722,735 11/1955 Beamish ........................ 156/555 X
4,038,026 7/1977 Wada et al. .................... 219/469 X
4,071,735 1/1978 Moser ................................ 219/216
4,281,623 8/1981 Kato et al. ...................... 219/216 X Primary Examiner—David A. Simmons
Attorney, Agent, or Firm—Ziems & Walter

[57] ABSTRACT

Disclosed herein is an apparatus for closely covering with a plastic film at least one surface of a base sheet such as identification card to improve the durability of the base sheet and to prevent any unauthorized alteration of information described thereon. The above apparatus includes a pair of conveying and pressing rollers and a heat radiation lamp incorporated therein to heat the circumference of at least one of the rollers. The base sheet and the plastic film overlaid are preheated by direct heat from the heat radiation lamp while being conveyed toward the pair of rollers, thereby achieving a high-speed processing and prevention of base sheet deformation. Also disclosed is an apparatus equipped with a heat transmission member along the base sheet feed path of a base sheet travelling path. The heat transmission member is adapted to present the base sheet and the plastic film, and may be formed by a part of a reflector plate.

2 Claims, 5 Drawing Figures

APPARATUS FOR COVERING BASE SHEET SURFACE

BACKGROUND OF THE INVENTION

1. Field of the Invention

This invention relates to an apparatus for covering closely at least one surface of a base sheet such as card, tag or label with a plastic film. More particularly, it relates to an apparatus of the above type, which is provided with heating and pressing rollers and a heat radiation lamp as a heating source for the rollers, whereby preheating the base sheet and the plastic film overlaid by a part of the heat radiated from the heat radiation lamp and thus featuring a rather short waiting period prior to the initiation of the covering work.

2. Description of the Prior Art

For a base sheet such as "name card," "identification card," "commutation ticket," "miniature calendar," or other card, tag or label, it is generally advantageous and, in many instances, is required to provide a surface covering which may be considered to be one mode of packaging so as to impart durability and water proofness thereto or to improved the durability and water proofness thereof and/or to prevent any unauthorized alteration of information shown on the base sheet.

To meet such a demand as mentioned above, a variety of base sheet surface covering apparatus have heretofore been proposed.

FIG. 1 is a fragmentary schematic illustration of an example of such prior art base sheet surface covering apparatus. It is designed to cover both surfaces of a base sheet. A base sheet travelling path P consists of a base sheet feed path P1, a base sheet heating and press-bonding path P2 and a base sheet discharge path P3, and a base sheet 2 to be covered on which a covering plastic film 1 is superposed in such a manner that the base sheet is interposed into a folded-shaped covering plastic film for example is conveyed and travels along the base sheet travelling path P. A pair of hollow rollers 3A, 3B are arranged on the base sheet heating and press-bonding path P2 in such a way that they abut on one another, thereby constituting a pinch roller unit 3. In addition, heaters 5A, 5B are disposed respectively in the internal spacings 4A, 4B of the rollers 3A, 3B.

An example of the above-mentioned covering plastic film 1 is shown in FIG. 2. On a surface of a surface layer CL made of a polyester film or the like, there is formed a bonding layer AL consisting of a thermoplastic resin such as polyethylene or the like so as to make up the covering plastic film. In the illustrated example, two film pieces are put together at their edges E with their bonding layers AL facing one another.

In a base sheet surface covering apparatus of such a construction as described above, the rollers 3A, 3B are heated from their interior by means of their respective heaters 5A, 5B. A base sheet 2 with the plastic film 1 superposed thereon is conveyed along the base sheet travelling path P from the base sheet feed path P1 to the base sheet heating and press-bonding path P2, where the plastic film 1 is heated and pressed by the rollers 3A, 3B and fused to stick with the base sheet 2, thereby completely covering the base sheet 2 at both surfaces thereof. Then, the resulting base sheet 2 is discharged from the apparatus along the base sheet discharge path P3.

Needless to say, one of the heaters 5A, 5B may be omitted if the above apparatus is adapted to cover one surface only.

In such a conventional base sheet surface covering apparatus as described above, the wall thickness of each of the rollers 3A, 3B is generally made relatively thick with a view toward heating uniformly the film 1 and the base sheet 2 to be covered. As a corollary to this, the rollers 3A, 3B have a large heat capacity. To use the apparatus when the rollers 3A, 3B have been cooled down due to, for example, a relatively long work interruption period over a night or the like, it takes a long time period (for example more than 5 minutes) after the starting of energizing of the heaters 5A, 5B until their temperatures reach a sufficient level for achieving a desired coverage, resulting in a drawback that a long waiting period is indispensable.

It may be effective to heat the circumferences of the rollers 3A, 3B by radiant heat, for example, in order to solve the above drawback. It may be feasible to shorten the waiting period by applying such radiant heat to the circumferences of the rollers 3A, 3B to raise the temperatures of the circumferences of the rollers 3A, 3B relatively fast. However, when the rollers have not yet been warmed up in their entirety, for example, immediately after turning on the heaters to use the covering apparatus, the radiant heat is absorbed in the interiors of the rollers and the film 1 and the base sheet 2 may not be applied with enough heat generally required at the base sheet heating and press-bonding path P2. Furthermore, in order to carry out the surface covering of the base sheet 2 at a high speed, it is certainly necessary to increase the temperatures of the rollers 3A, 3B still further. In this case, the base sheet 2 superposed with the plastic film 1 is abruptly subjected to a large temperature change and the base sheet 2, after the surface covering processing, may develop a deformation such as warping or twisting.

SUMMARY OF THE INVENTION

The present invention has been completed with the foregoing in view. Accordingly, an object of this invention is to provide an apparatus for covering at least one surface of a base sheet, which apparatus features a relatively short waiting period upon its application and can surely achieve the desired surface covering processing at a high speed without developing a deformation on the base sheet.

Another object of this invention is to provide an apparatus for covering at least one surface of a base sheet, which apparatus enjoys a high utilization coefficient of heat and thus features a low energy consumption.

DETAILED DESCRIPTION OF PREFERRED EMBODIMENTS OF THE INVENTION

Figure 1:
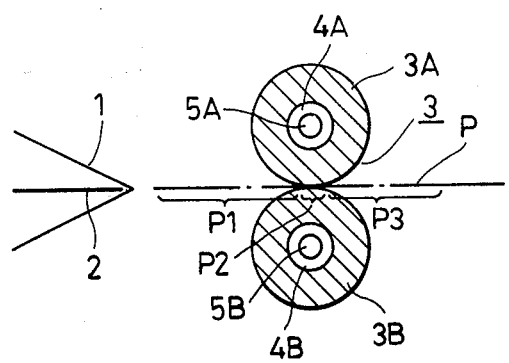
FIG. 1 is a fragmentary schematic illustration of an example of conventional base sheet surface covering apparatus.
Figure 3:
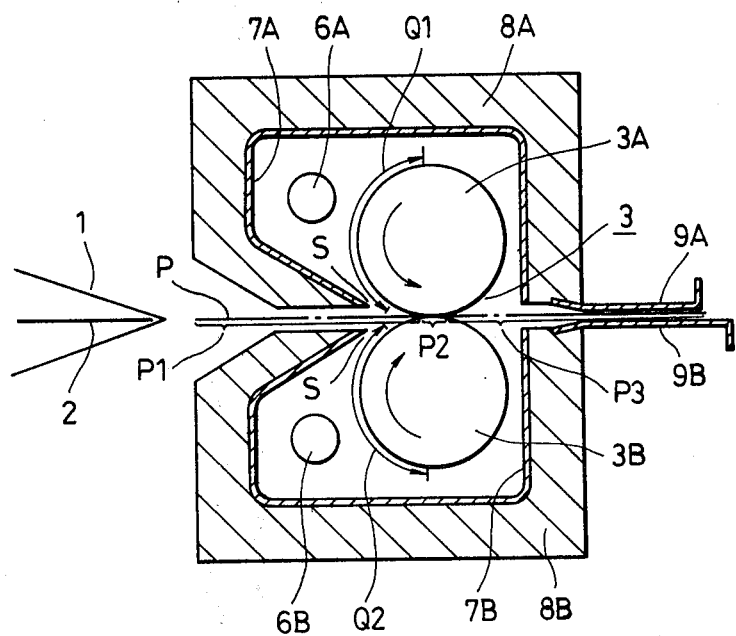
FIG. 3 is a schematic cross-sectional view of one embodiment of the base sheet surface covering apparatus according to this invention.
Figure 2:
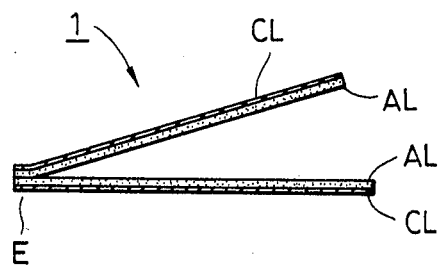
FIG. 2 is a schematic cross-sectional view of an example of a covering plastic film.

In one embodiment of the present invention, as illustrated in FIG. 3, a pair of rollers 3A, 3B are disposed in abutment with the base sheet heating and press-bonding path P2 of the base sheet travelling path P interposed therebetween to constitute a pinch roller unit 3. Facing the circumferences of the rollers 3A, 3B, are respectively arranged heat radiation lamps 6A, 6B such as halogen lamps or infrared lamps. These heat radiation lamps 6A, 6B are positioned in such a way that they face the circumferential areas Q1, Q2 of their corresponding rollers 3A, 3B, which areas Q1, Q2 run toward the base sheet heating and press-bonding path P2, and they also confront a portion of the base sheet feed path P1, which portion is close to the base sheet heating and press-bonding path P2. Reflector plates 7A, 7B, each made of aluminum for instance, are provided so as to surround or embrace the circumferential areas of their corresponding rollers 3A, 3B other than the region including the base sheet heating and press-bonding path P2 and in the internal spaces of the reflector plates 7A, 7B said heat radiation lamps 6A, 6B are located respectively. Spacings S, S are formed between one end of these reflector plates 7A, 7B and their corresponding rollers 3A, 3B, through which spacings S, S the heat radiation lamps 6A, 6B may directly radiate the portion of the base sheet feed path P1, which portion is close to the base sheet heating and press-bonding path P2. Numerals 8A, 8B designate heat insulator layers provided to cover the outside surfaces of the reflector plates 7A, 7B, whereas numerals 9A, 9B indicate cooling guide plates extending along a part of the base sheet discharge path P3.

Since the base sheet surface covering apparatus of this invention is constructed as described above, the rollers 3A, 3B are heated by radiant heat given off from the heat radiation lamps 6A, 6B. At this state, the base sheet 2 and the plastic film 1 superposed on the base sheet 2 is first of all preheated at the spacings S, S of the base sheet feed path P1, and then heated and press-bonded by rollers 3A, 3B on the base sheet heating and press-bonding path P2 while being conveyed along the base sheet travelling path P.

Accordingly, it is possible to shorten the waiting time period required until the sufficiently desired coverages of base sheets are actually achieved from the start of the apparatus even if the apparatus is started at when the rollers 3A, 3B are cold, because the heat radiation lamps 6A, 6B reach a full lighting state immediately after turning them on; the rollers 3A, 3B are heated at the circumferential areas Q1, Q2 running toward the base sheet heating and press-bonding path P2 and located right before the same path P2, thereby allowing the circumferential areas Q1, Q2 to reach the base sheet heating and press-bonding path P2 in a very short period of time, and accordingly, without the temperature drop in the areas Q1, Q2 or with the minimized temperature drop therein if any, moreover, the base sheet 2 and the film 1 are preheated by radiant heat passing directly from the heat radiation lamps 6A, 6B through the spacings S, S, the lamp having already been in the full lighting state, to the base sheet feed path P1 just before the base sheet 2 with the film 1 reaches the base sheet heating and press-bonding path P2, thereby permitting a considerably lower circumferential temperature as a temperature required for the rollers 3A, 3B at the base sheet heating and press-bonding path P2.

Figure 4:
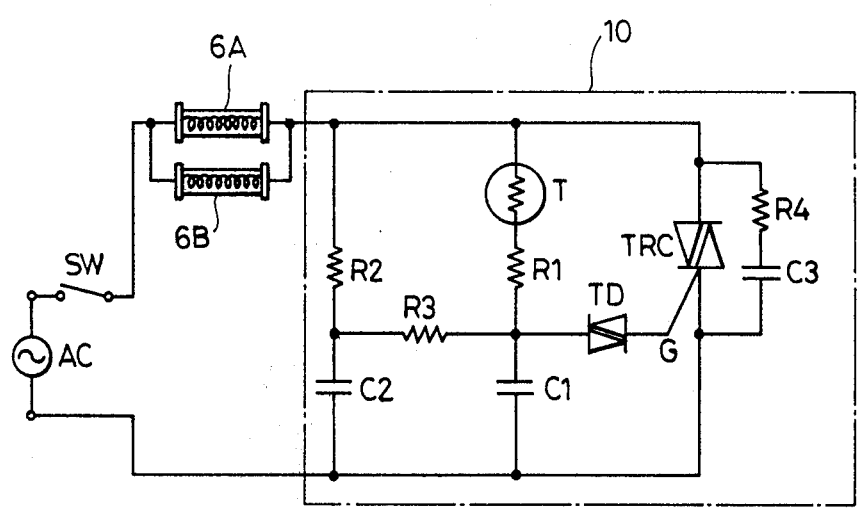
FIG. 4 is an explanatory circuit diagram showing an example of the heat radiation lamp control system which is suitably incorporated in the present invention.

As a heat radiation lamp control system adapted to control the heat radiation lamps 6a, 6B, it is particularly preferred to employ a phase control circuit which controls the currents to be fed to the heat radiation lamps 6A, 6B in accordance with signals from a temperature sensor for detecting the temperature of at least one of the rollers 3A, 3B. In the contrast with the ON-OFF control circuits, which are generally employed in the conventional base sheet covering apparatus, the phase control circuit can perform the control of the radiant heat to be generated by the heat radiation lamps 6A, 6B while always maintaining the lamps 6A, 6B in a lighting state. Therefore, the intensity variation of the radiant heat takes place gently and the extent of the intensity variation is minimized. FIG. 4 illustrates, by way of example, a heat radiation lamp control system 10 which incorporates such a phase control circuit. In this example, a PTC thermistor is used as a temperature sensor for detecting the circumferential temperature of at least either one of the rollers 3A, 3B. To an a.c. power supply AC, is connected through a switch Sw and the heat radiation lamps 6A, 6B connected in parallel or series a series circuit of a PTC thermistor T, a compensating resistor R1 and a capacitor C1 for controlling the triac conduction timing (hereinafter called "control capacitor"). A trigger diode TD is interposed between the junction between the control capacitor C1 and compensating resistor R1 and a gate G of a triac TRC connected in series with the heat radiation lamps 6A, 6B. Resistors R2, R3 and capacitor C2 serve together to damp the hysterisis, and a resistor R4 and capacitor C3 make up a surge current absorption circuit to prevent the malfunction of the triac TRC.

The actuation of the heat radiation lamps 6A, 6B is controlled as follows. When the switch SW is closed, an a.c. voltage is applied to and charged in the control capacitor C1 via the PTC thermistor T and compensating resistor R1. As soon as the thus-charged voltage reaches the break-over voltage of the trigger diode TD, the control capacitor C1 is caused to discharge through the trigger diode TD a signal current to the gate G of the triac TRC, whereby rendering the triac TRC conductive and permitting a current to be fed to the heat radiation lamps 6A, 6B. The above operation is repeated every half cycle of the a.c. current. Since the temperature of the PTC thermistor T is dependent on the circumferential temperature of the associated one of the rollers 3A, 3B, when, for instance, the circumferential temperature goes up and the resistance of the PTC thermistor T increases, the voltage applied to the control capacitor C1 drops and a longer charging time period is required to reach with the thus-dropped voltage the break-over voltage of the trigger diode TD. As a result, the conduction timing of the triac TRC is delayed from each half cycle of the a.c. voltage, thereby decreasing in accordance with a temperature rise of the PTC thermistor T the current flowing through the heat radiation lamps 6A, 6B and thus reducing the intensity of light to be emitted from the heat radiation lamps 6A, 6B.

Figure 5:
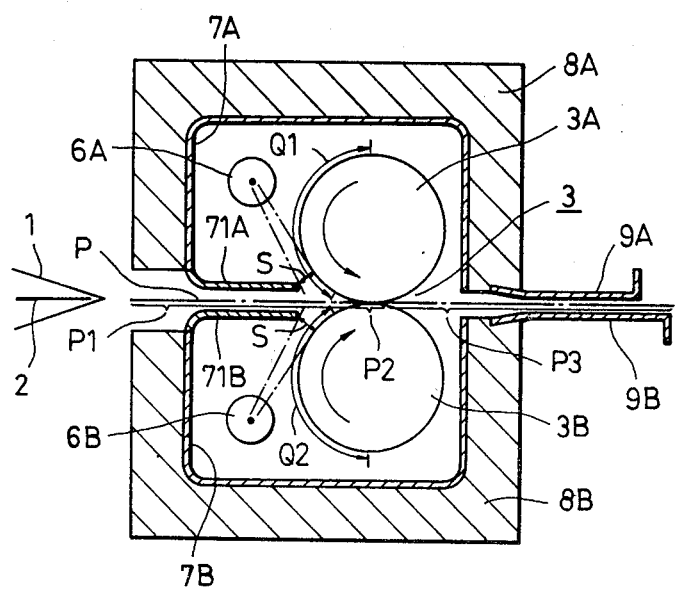
FIG. 5 is a schematic cross-sectional view showing another embodiment of the base sheet surface covering apparatus according to this invention.

FIG. 5 illustrates another embodiment of this invention, in which heat transmission parts 71A, 71B, which are disposed in a face-to-face relationship with the base sheet feed path P1 interposed therebetween and extend toward the base sheet heating and press-bonding path P2. The parts 71A, 71B are formed, for example, by end portions of their corresponding reflector plates 7A, 7B, which end portions extend to their respective spacings S, S. These heat transmission parts 71A, 71B are free of any heat insulator layer.

In an apparatus as described above as another embodiment of this invention, it may not be possible to bring about a great effect shortly after the apparatus has been brought into operation because not much heat quantity has yet been accumulated in the reflector plates 7A, 7B. When the temperatures of the rollers 3A, 3B have risen after the lapse of a certain time period from the initiation of the operation, the heat radiation lamps 6A, 6B are controlled by the heat radiation lamp control system 10 so as to reduce the intensity of radiant heat to be generated from each of the lamps 6A, 6B. Although the degree of preheating of the base sheet 2 by radiant heat irradiated thereon through the spacings S, S is therefore lowered, the reflector plates 7A, 7B have already been given much radiant heat from the heat radiation lamps 6A, 6B and the reflector plates 7A, 7B and their respective heat transmission parts 71A, 71B have thus been heated up, achieving the more sufficient preheating of the base sheet 2 by the heat transmission parts 71A, 71B.

Thus, the base sheet 2 and the film 1 are preheated by the heat accumulated in the reflector plates 7A, 7B immediately before the preheating by the radiant heat through the spacings S, S, and consequently, the still more preheating of the base sheet 2 and the film 1 is carried out after a certain time passed from the initiation of an operation. As a result, the base sheet covering processing can obviously be carried out at a high speed because the heat to be transmitted at the base sheet heating and press-bonding path P2 to the base sheet 2 and the film 1 from the rollers 3A, 3B may be reduced and the base sheet 2 and the film 1 are heated always in two or three steps in total, thereby protecting the base sheet 2 from any abrupt large temperature change and thus avoiding the twist or warp deformation of the base sheet 2.

Furthermore, if cooling guide plates 9A, 9B are provided to extend along the base sheet discharge path P3 as in the respective illustrated embodiments, the base sheet 2 covered with the film 1 is allowed to cool down slowly as a whole after the surface covering processing and is thus prevented from developing a warp or twist deformation at this stage. Thus, a provision of such cooling guide plates is preferred. Here, one of the cooling guide plates 9A, 9B may be provided displaceably relative to the other cooling guide plate so as to ensure the contact of the base sheet 2 to them. However, it should be noted that the cooling guide plates 9A, 9B are not essential to the present invention. In place of such cooling guide plates or in combination with them, it may be possible to provide discharge rollers.

Since the preheating of the base sheet 2 and the film 1 is performed by a part of the radiant heat from the heat radiation lamps 6A, 6B, which radiant heat does not directly contribute to the heating of the rollers 3A, 3B, including the radiant heat obtained through the heat transmission parts, the utilization coefficient of the overall radiant heat irradiated by the lamps has been considerably improved, thereby contributing to save the energy consumption of the heat radiation lamps 6A, 6B.

Although the present invention has been described in the above with reference to apparatus designed to cover both surfaces of the base sheet 2, an apparatus for covering only one of the surfaces of the base sheet 2 may be provided with either one of the heat radiation lamps 6A, 6B only.

As has been described above, it is possible to obtain in accordance with the base sheet surface covering apparatus of the present invention such effects that the waiting time period is short upon starting a surface covering operation, the surface covering processing can be achieved surely at a high speed without subjecting the base sheet to any deformation, and the overall energy consumption can be saved.

What is claimed is:

1. Laminating apparatus for covering opposite surfaces of a base sheet with plastic film while causing said base sheet to travel together with said plastic film superposed thereon along a base sheet travelling path, which consists of a base sheet feed path, a base sheet heating and press-bonding path and a base sheet discharge path, including a pair of rollers provided in abutment with the base sheet heating and press-bonding path interposed therebetween so as to constitute a pinch roller unit, said apparatus comprising a heat radiation lamp disposed in the vicinity of each of said rollers in such a way that said heat radiation lamp faces a circumferential area of each of said rollers, which area is running toward said base sheet heating and press-bonding path, and said heat radiation lamp also confronts said base sheet feed path, a heat radiation lamp control system adapted to control said heat radiation lamp in such a way that the intensity of the radiant heat from said heat radiation lamp is decreased when the temperature of the circumference of each of said rollers, facing said heat radiation lamp, has risen beyond a predetermined level, and heat transmission members disposed along and on opposite sides of said base sheet feed path and adapted to receive radiant heat from said heat radiation lamps, respectively, thereby irradiating said base sheet and said plastic film travelling on said base sheet feed path with a part of said radiant heat from said heat radiation lamp, said heat radiation lamps being the sole source of heat for laminating said film to said base sheet.

2. The apparatus as claimed in claim 1, wherein said heat transmission member is formed by a part of a reflector plate which is provided in such a way that it embraces the spacing in which each of said heat radiation lamps and said said rollers are located, respectively.

* * * * *